US011604659B2

(12) United States Patent
Naik

(10) Patent No.: US 11,604,659 B2
(45) Date of Patent: Mar. 14, 2023

(54) AUTOMATED PROPAGATION OF SERVER CONFIGURATION ON A SERVER CLUSTER

(71) Applicant: DigiCert, Inc., Lehi, UT (US)

(72) Inventor: Alok Naik, Bangalore (IN)

(73) Assignee: DigiCert, Inc., Lehi, UT (US)

( * ) Notice: Subject to any disclaimer, the term of this patent is extended or adjusted under 35 U.S.C. 154(b) by 0 days.

(21) Appl. No.: 16/601,291

(22) Filed: Oct. 14, 2019

(65) Prior Publication Data
US 2020/0117479 A1 Apr. 16, 2020

Related U.S. Application Data

(63) Continuation of application No. 15/238,561, filed on Aug. 16, 2016, now Pat. No. 10,445,109.

(51) Int. Cl.
G06F 9/44 (2018.01)
G06F 9/445 (2018.01)
G06F 1/32 (2019.01)
H04L 9/32 (2006.01)
H04L 9/08 (2006.01)

(52) U.S. Cl.
CPC ............ *G06F 9/44505* (2013.01); *G06F 1/32* (2013.01); *H04L 9/0825* (2013.01); *H04L 9/0891* (2013.01); *H04L 9/3268* (2013.01)

(58) Field of Classification Search
CPC ............. G06F 1/32; G06F 9/44; H04L 9/0825
See application file for complete search history.

(56) References Cited

U.S. PATENT DOCUMENTS

| 6,226,618 | B1* | 5/2001 | Downs | H04L 67/18 |
| | | | | 705/51 |
| 9,009,463 | B2 | 4/2015 | Yin | |
| 10,454,689 | B1* | 10/2019 | Sharifi Mehr | H04L 63/166 |
| 2006/0044610 | A1* | 3/2006 | Miyata | G06F 21/608 |
| | | | | 358/1.15 |
| 2007/0153580 | A1* | 7/2007 | Luft | G06F 21/606 |
| | | | | 365/185.19 |
| 2010/0228982 | A1 | 9/2010 | Zhu et al. | |
| 2011/0038483 | A1 | 2/2011 | Goeller et al. | |
| 2011/0069836 | A1* | 3/2011 | Rae | G06F 21/10 |
| | | | | 380/259 |

(Continued)

Primary Examiner — Keshab R Pandey
(74) Attorney, Agent, or Firm — Knobbe, Martens, Olson & Bear, LLP

(57) ABSTRACT

Techniques are disclosed to automate secure propagation of a configuration to a plurality of servers in a server cluster. For example, the techniques may include a method. The method may include receiving, at a first computing device, a first public key associated with a target computing device, the first computing device having an updated configuration. The method may further include encrypting, at the first computing device, the updated configuration using the first public key. The method may further include sending the encrypted configuration to the target computing device. The method may further include decrypting, at the target computing device, the encrypted configuration using a first private key associated with the target computing device, wherein the first public key and the first private key are a first keypair associated with the target computing device. The method may further include updating the target computing device with the updated configuration.

24 Claims, 10 Drawing Sheets

(56) References Cited

U.S. PATENT DOCUMENTS

| | | | |
|---|---|---|---|
| 2011/0173455 A1* | 7/2011 | Spalka | H04L 9/0863 |
| | | | 713/189 |
| 2014/0013109 A1* | 1/2014 | Yin | H04L 63/0823 |
| | | | 713/156 |
| 2015/0341325 A1* | 11/2015 | Al Jabri | H04L 9/0825 |
| | | | 713/156 |
| 2016/0269176 A1* | 9/2016 | Pang | H04L 9/0841 |
| 2018/0268380 A1* | 9/2018 | Bisbee | G06Q 20/042 |

\* cited by examiner

AUTOMATED PROPAGATION OF SERVER CONFIGURATION ON A SERVER CLUSTER

CROSS-REFERENCE TO RELATED APPLICATIONS

The present application is a continuation of U.S. patent application Ser. No. 15/238,561, entitled "Automated Propagation of Server Configuration on a Server Cluster," filed on Aug. 16, 2016, which is hereby incorporate by reference in its entirety.

BACKGROUND

Field

Embodiments of the invention generally relate to techniques for managing a configuration of a plurality of servers. More specifically, embodiments presented herein are directed to an automated approach for securely propagating a configuration to a plurality of servers in a server cluster.

Description of the Related Art

A set of computing devices (e.g., plurality of servers) may share a configuration in a number of contexts. For example, it is common for computer servers to use digital certificates (e.g., secure sockets layer (SSL) certificates) to associate a server with a network domain. In such cases, clients use information contained in a certificate to verify the identity of a server and to establish a secure communication session with that server (e.g., an SSL or TLS session with a web server). More generally, digital certificates and public key infrastructure (PKI) techniques are used to create, distribute, and manage cryptographic keys used in a variety of contexts.

A plurality of servers may utilize the same digital certificate (and associated private key) to associate each server with a network domain and enable secure sessions. Such a plurality of servers that share the same digital certificate (or other configuration settings, e.g., algorithm running on the plurality of servers) may be referred to as a server cluster. In one example, each server of the server cluster may run the same application and therefore require the same digital certificate to be used for clients to enable a secure session. In such cases, each server may be associated with the same hostname, and therefore, the SSL certificate may list the shared hostname. Such server clusters may be referred to as homogenous clusters.

In another example, each server of the server cluster may run a different application, but still utilize the same digital certificate to enable secure sessions. For example, the digital certificate could be a wildcard certificate or could have multiple subject alternative names (SANs) that list multiple IP addresses or hostnames associated with the servers of the server cluster. Such server clusters may be referred to as a heterogeneous cluster. Further, some clusters may be a mix of homogenous and heterogeneous clusters.

Accordingly, server clusters may share digital certificates on multiple IP addresses and/or multiple ports. Further, the servers in the server cluster may be located in different geographical areas, run different applications, run different operating systems, etc. Managing such a shared digital certificate (or other configuration) across such varied servers in a server cluster can be challenging.

In particular, the configuration (e.g., digital certificate and associated private key) of each of the servers in a server cluster may need to be updated (e.g., replace the digital certificate with a new digital certificate) for a variety of reasons (e.g., initial provisioning of a server, renewal of an expired digital certificate, replacement of a digital certificate due to key compromise or loss, etc.). For example, where the shared configuration for the server cluster is a digital certificate, a new digital certificate and associated private key may need to be propagated to each server of the server cluster.

Currently, in order to propagate a new digital certificate and private key to each server of a server cluster, an administrator may need to manually copy the digital certificate and private key to each server of the server cluster. This may be an especially difficult and time consuming process as the servers may be in a variety of geographical areas, run different applications, run different operating systems, etc. Further, the manual copying process may not be secure, as the means used to transfer the copy (e.g., flash drive) may not be secure and may be compromised, meaning the digital certificate and private key may be compromised.

SUMMARY

One embodiment presented herein includes a computer-implemented method for updating at least one target computing device of a plurality of computing devices having a shared configuration. The method comprises receiving, at a first one of the computing devices, a first public key associated with a target computing device of the computing devices, the first computing device having an updated configuration. The method further comprises encrypting, at the first computing device, the updated configuration using the first public key. The method further comprises sending the encrypted configuration to the target computing device. The method further comprises decrypting, at the target computing device, the encrypted configuration using a first private key associated with the target computing device, wherein the first public key and the first private key are a first keypair associated with the target computing device. The method further comprises updating the target computing device with the updated configuration.

Another embodiment presented herein includes a computing system for updating at least one target computing device of a plurality of computing devices having a shared configuration. The computing system comprises a first computing device comprising a memory and a processor configured to receive a first public key associated with a target computing device, the first computing device having an updated configuration. The processor of the first computing device is further configured to encrypt the updated configuration using the first public key. The processor of the first computing device is further configured to send the encrypted configuration to the target computing device. The computing system further comprises a target computing device comprising a memory and a processor configured to decrypt the encrypted configuration using a first private key associated with the target computing device, wherein the first public key and the first private key are a first keypair associated with the target computing device. The processor of the target computing device is further configured to update the target computing device with the updated configuration.

Another embodiment presented herein includes a non-transitory computer-readable medium comprising instructions that when executed by a computing device cause the computing device to perform a method for updating at least one target computing device of a plurality of computing devices having a shared configuration. The method comprises receiving, at a first one of the computing devices, a first public key associated with a target computing device of the computing devices, the first computing device having an updated configuration. The method further comprises encrypting, at the first computing device, the updated configuration using the first public key. The method further comprises sending the encrypted configuration to the target computing device. The method further comprises decrypting, at the target computing device, the encrypted configuration using a first private key associated with the target computing device, wherein the first public key and the first private key are a first keypair associated with the target computing device. The method further comprises updating the target computing device with the updated configuration.

Another embodiment presented herein includes a computing system for updating at least one target computing device of a plurality of computing devices having a shared configuration. The computing system comprises means for receiving, at a first one of the computing devices, a first public key associated with a target computing device of the computing devices, the first computing device having an updated configuration. The computing system further comprises means for encrypting, at the first computing device, the updated configuration using the first public key. The computing system further comprises means for sending the encrypted configuration to the target computing device. The computing system further comprises means for decrypting, at the target computing device, the encrypted configuration using a first private key associated with the target computing device, wherein the first public key and the first private key are a first keypair associated with the target computing device. The computing system further comprises means for updating the target computing device with the updated configuration.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
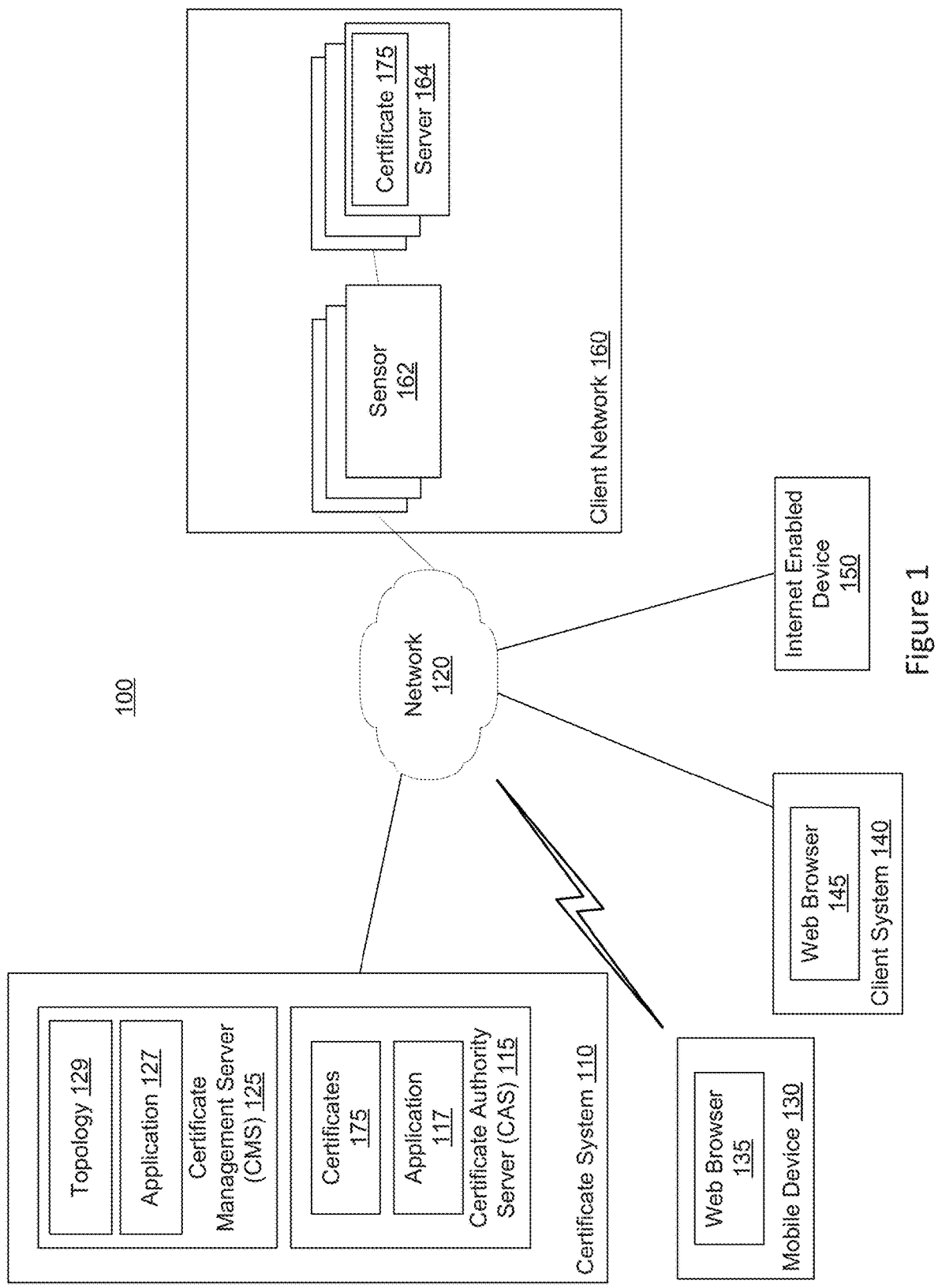
FIG. 1 illustrates an example computing environment, according to one embodiment.

Embodiments presented herein provide techniques to automate and secure the propagation of a configuration to a plurality of servers in a server cluster. In particular, certain embodiments are described herein with respect to propagation of a digital certificate and associated private key to each server in the server cluster. It should be noted, that though embodiments may be described with respect to such a digital certificate and associated private key, the same techniques may also be applied to automate and secure the propagation of other configurations to the servers of a server cluster.

Embodiments presented herein may help to increase the security and reduce the complexity and time required to update a digital certificate across a server cluster. In particular, embodiments presented herein may ensure that the digital certificate and associated private key is properly encrypted when being propagated to each server.

Further, embodiments presented herein may help to ensure propagation of a digital certificate across disparate servers (e.g., in different locations, having different levels accessibility, running different operating systems, running different applications, etc.) in a server cluster using a single automated system, thereby reducing the complexity required to update such servers. In particular, embodiments presented herein may allow for servers (e.g., running on an independent client network) that are normally inaccessible to an outside network (e.g., the Internet) to be updated via a control mechanism on the outside network.

In one embodiment, a computing system, which may be referred to as a certificate system, may identify the presence of digital certificates on the servers of a client network. In some embodiments, the certificate system may be a cloud-based system. In particular, the certificate system and the client network may communicate via a shared network (e.g., the Internet). Further, the client network may include one or more computing devices configured to run one or more applications (referred to herein as "sensors"). The one or more computing devices may communicate in the client network with the servers of the client network. The certificate system may direct the sensors to initiate an SSL handshake with each of the servers on the client network and identify the presence of any digital certificates on the servers. The sensors may send the information (e.g., digital certificate presence) to the certificate system, which may then generate a topology of the client network including the servers, sensors, and digital certificates on the servers and how devices are interconnected. The certificate system may determine any servers/applications running on the servers that share a digital certificate and may associate such servers/applications as part of a server cluster. Further, the certificate system may determine how each server can be accessed. For example, some servers may not be directly accessible from a network or another server, and instead may only be accessed via a particular sensor. Further, some sensors may be able to directly communicate with each other, and some may only be able to communicate via the certificate system.

Further, in an embodiment the certificate system may identify a server of the server cluster to initially update and control update of the identified server. For example, the certificate system may instruct a sensor in communication with the server, to initiate creation of a keypair at the server. The keypair may include a public key and private key pair that is part of an asymmetric cryptography scheme as known in the art. In particular, data encrypted using the public key of the keypair may be decrypted using the private key, using a known cryptography algorithm for encryption and decryption. The public key may be made public, while the private key may be held securely and privately, such that only a holder of the private key can successfully decrypt data encrypted using the corresponding public key.

The server may send the generated public key in a certificate signing request (CSR) to the associated sensor, which sends the request to the certificate system. The certificate system may then generate a digital certificate associated with the server cluster and keypair using known techniques, and send the digital certificate to the server via the sensor. Accordingly, the generated keypair including the private key and the public key may be associated with the digital certificate.

Further, in an embodiment, the certificate system may instruct one of the sensor (also referred to as the "seed sensor") of the server (also referred to as the "seed server) with the digital certificate (the one of which may also be referred to as the "seed control agent") to propagate the digital certificate and associated private key to another server (also referred to as the "target server") in the server cluster. In particular, the certificate system may retrieve a public key associated with a private key held by the target server, and send the public key to the seed control agent. The seed control agent may direct the seed server to encrypt the digital certificate and associated private key with the public key of the target server. The seed control agent may send (e.g., directly or indirectly) the encrypted digital certificate and associated private key to the target server. The target server may decrypt the encrypted digital certificate and associated private key with its own private key, and install the digital certificate and associated private key. The certificate system may further instruct the seed control agent to similarly propagate digital certificate and generated private key to additional servers of the server cluster. Further, in some embodiments, the target server after installation, may act as a seed server and its associated sensor as a seed sensor.

FIG. 1 illustrates an example computing environment 100, according to one embodiment. As shown, the computing environment 100 includes, a certificate system 110, a mobile device 130, a client system 140, internet enabled device 150, and a client network 160 each connected to a network 120 (e.g., the internet). The certificate system 110 includes a certificate management server (CMS) 125 and a certificate authority server (CAS) 115. The certificate system 110 is included to be representative of a physical computing system, as well as representative of virtual machine instances deployed to a computing cloud. For example, each of CAS 115 and CMS 125 may be representative of one or more physical servers, as well as representative of virtual machine instances deployed to a computing cloud.

The client network 160 includes one or more sensors 162 and one or more servers 164. Each of the servers 164 may representative of a physical computing system (e.g., a server). Further each of the servers 164 may run any of a variety of applications, such as web-server applications (e.g., Apache or Nginx) configured to communicate with client systems using HTTPS and related protocols. Each server 164 may also store one or more digital certificates 175 (and any associated private keys) associated with the server. In some embodiments, each digital certificate 175 may be further associated with one of the applications running on the server 164. Each of the servers 164 may also communicate with other applications on certificate system 110 (or other systems), such as an application server and a database to respond to requests from client systems 130 and 140.

Each of the sensors 162 is representative of an application that may run on a physical computing system (e.g., one or more physical computing devices (e.g., server, general purpose computing device, etc.)). Further, in some embodiments, multiple sensors 162 may run on a single computing device or separate computing devices. In some embodiments, each of the sensors 162 may be associated with and communicate with one or more of the servers 164. For example, each sensor 162 may be associated with servers 164 in a different range of internet protocol (IP) addresses. For example, a first sensor 162 may be associated with any servers 164 with an IP address in the range of 192.168.0.1-192.168.0.99, and a second sensor 162 may be associated with any servers 164 with an IP address in the range of 192.168.0.100-192.168.0.199. Further, in some embodiments, each server 164 may be associated and communicate with only one sensor 162.

Each of the sensors 162 and servers 164 may be provisioned with a keypair including a private key and a public key, such as using known provisioning techniques. Accordingly, each of the sensors 162 and servers 164 may be associated with a private key and a public key for secure communication. Each private key and public key keypair associated with each sensor 162 and server 164 may be different from each other and also different than each private key and public key keypair associated with each digital certificate 175. Similarly, each private key and public key keypair associated with each digital certificate 175 may be different for different digital certificates 175 and the same for shared digital certificates 175.

In some embodiments, a given server 164 may be able to execute processes discussed herein on its own, such as decrypting encrypted data, generating keys, installing keys and certificates, etc. In some embodiments, a given server 164 may not be able to execute such processes (e.g., if the server 164 is a different type of network component such as a load balancer and not an actual server), so instead a sensor 162 may control such actions at the server 164 (e.g., through a remote login and running a script on the server 164).

Client system 140 is generally included to be representative of a general purpose computing system, such as a desktop or laptop computer. As shown, the client system 140 includes a web-browser 145 used to communicate with servers 164. Mobile device 130 is generally included to be representative of small mobile computing devices, such as smart phones and computing tablets. Like client system 140, the mobile device 130 executes a web-browser 135 in order to communicate with servers 164. Internet-enabled device 150 generally includes any other device capable of communicating over network 120, e.g., consumer products such as thermostats, appliances, televisions, etc. that include a network interface—sometimes referred to as "the internet of things." Device 150 may include a web-client used to establish a communication session (including secure sessions) with servers 164. More generally, web browser 135, web browser 145, and device 150 may be capable of establishing a secure communication session with a server 164, e.g., by initiating an SSL or TLS handshake with a service at a given IP address and port combination. Further, the request may specify capabilities (or preferences) of the client for the secure session. As part of the handshake, a server 164 may present a digital certificate (and public key) used by the client in order to complete the handshake and establish a secure session.

As shown, CAS 115 may store copies of the digital certificates 175 stored on the servers 164. Further, the CAS 115 may run an application 117 configured to generate the digital certificates 175. The CAS 115 (and/or the CMS 125) may further store the public keys associated with each of the sensors 162 and servers 164 and public keys associated with each of the digital certificates 175.

Further, as shown, the CMS 125 may store information about the topology 129 of the client network 160 including digital certificates 175 stored on the servers 164. For example, the CMS 125 may run an application 127 configured to control the sensors 162 to identify certificates 175 stored at the servers 164 and communicate the information to the application 127. Further, the application 127 may be configured to utilize the topology 129 to control propagation of digital certificates 175 shared by servers 164 in a server cluster as discussed herein.

The topology 129 may indicate how many servers 164 and sensors 162 are in the client network 160. The topology 129 may further indicate how the sensors 162 and servers 164 are connected, as further described herein. The sensors 162 and servers 164 may be connected according to any appropriate topology. In particular, some sensors 162 may communicate directly with other sensors 162, and others may not have a direct connection and instead communicate via the network 120 (e.g., via the certificate system 110). Further, some servers 164 may communicate directly with other servers 164, and others may not have a direct connection and instead communicate via sensors 162. Some servers 164 may have access to the network 120, and some servers may not have access to the server 164 and may instead only communicate via another server 164 and/or sensor 162. Some sensors 162 may be associated with servers in different server clusters, and some sensors 162 may be associated only with servers in a single server cluster. Further, some servers 164 of a given server cluster may be associated with the same sensor 162, and some servers 164 of a given cluster may be associated with different sensors 162.

Figure 1A:
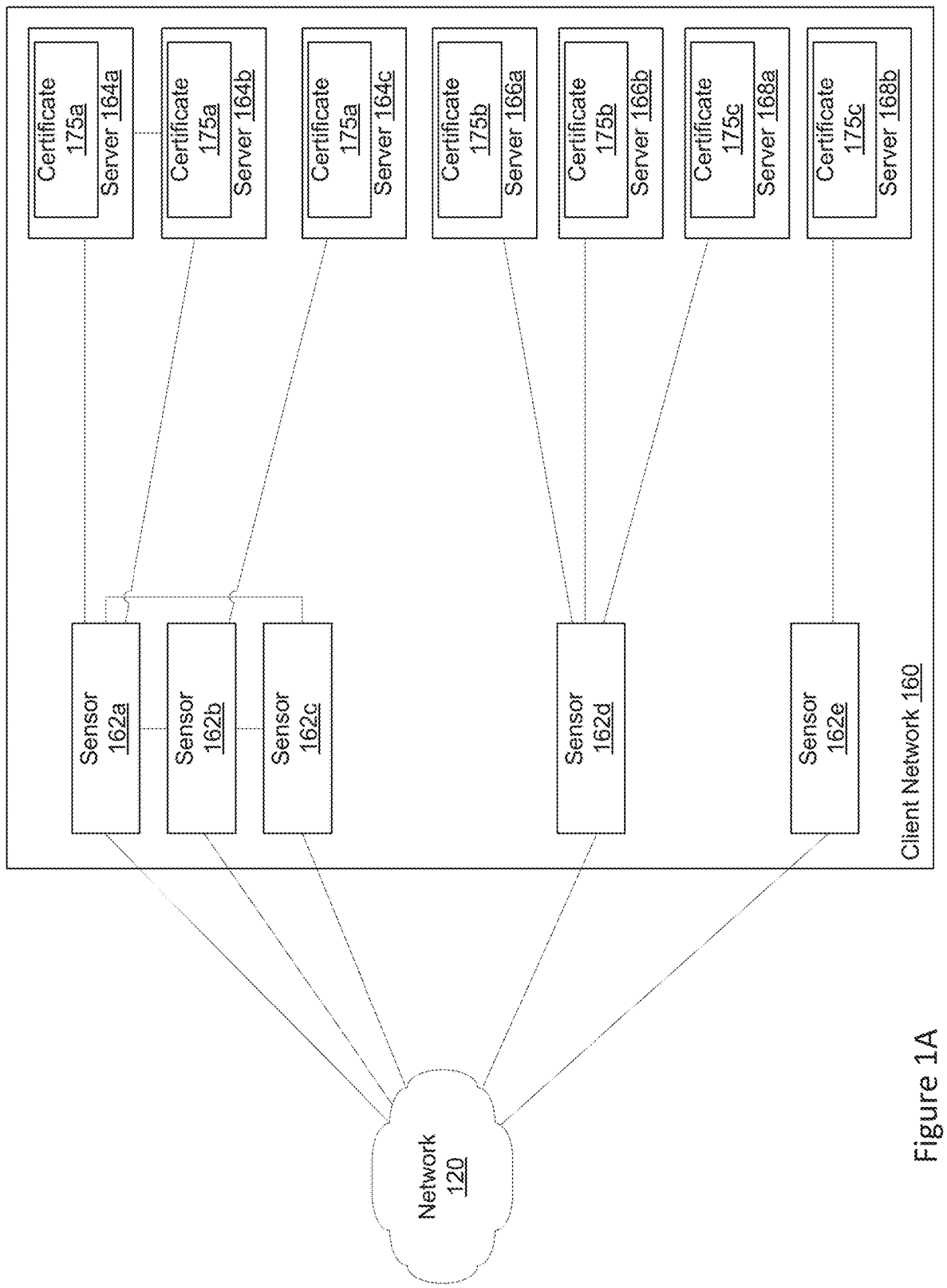
FIG. 1A illustrates an example topology of a client network of FIG. 1, according to one embodiment.

For example, FIG. 1A illustrates an example topology of the client network 160. As shown the client network 160 includes sensors 162a-162e. Further, the client network 160 includes servers 164a-164c, 166a-166b, and 168a-168b. As shown, servers 164a-164c are part of a first server cluster sharing digital certificate 175a, servers 166a-166b are part of a second server cluster sharing digital certificate 175b, and servers 168a-168b are part of a third server cluster sharing digital certificate 175c. Though not shown, each of the sensors 162a-162g may be associated with other servers of any server cluster.

As shown, the sensors 162a-162c are all able to directly communicate with each other. Further, sensors 162a and 162b are associated with servers 164a-164c of the first server cluster. In addition, servers 164a and 164b are able to directly communicate with each other, but server 164c is unable to directly communicate with either of servers 164a or 164b. Accordingly, server 164c may communicate with servers 164a and 164b via sensors 162b and 162a.

Further, as shown, each of the servers 166a and 166b are associated with the sensor 162d. The servers 166a and 166b are not able to directly communicate with each other, but instead may communicate via the sensor 162d.

In addition, the server 168a of the third server cluster is associated with the sensor 162d and the server 168b of the third server cluster is associated with the sensor 162e. Neither the servers 168a and 168b nor the sensors 162d and 162e are able to communicate directly with each other. Accordingly, the server 168a may communicate with the server 168b via the sensor 162d, the network 120 (e.g., via the certificate system 110), and the sensor 162e.

Figure 1B:
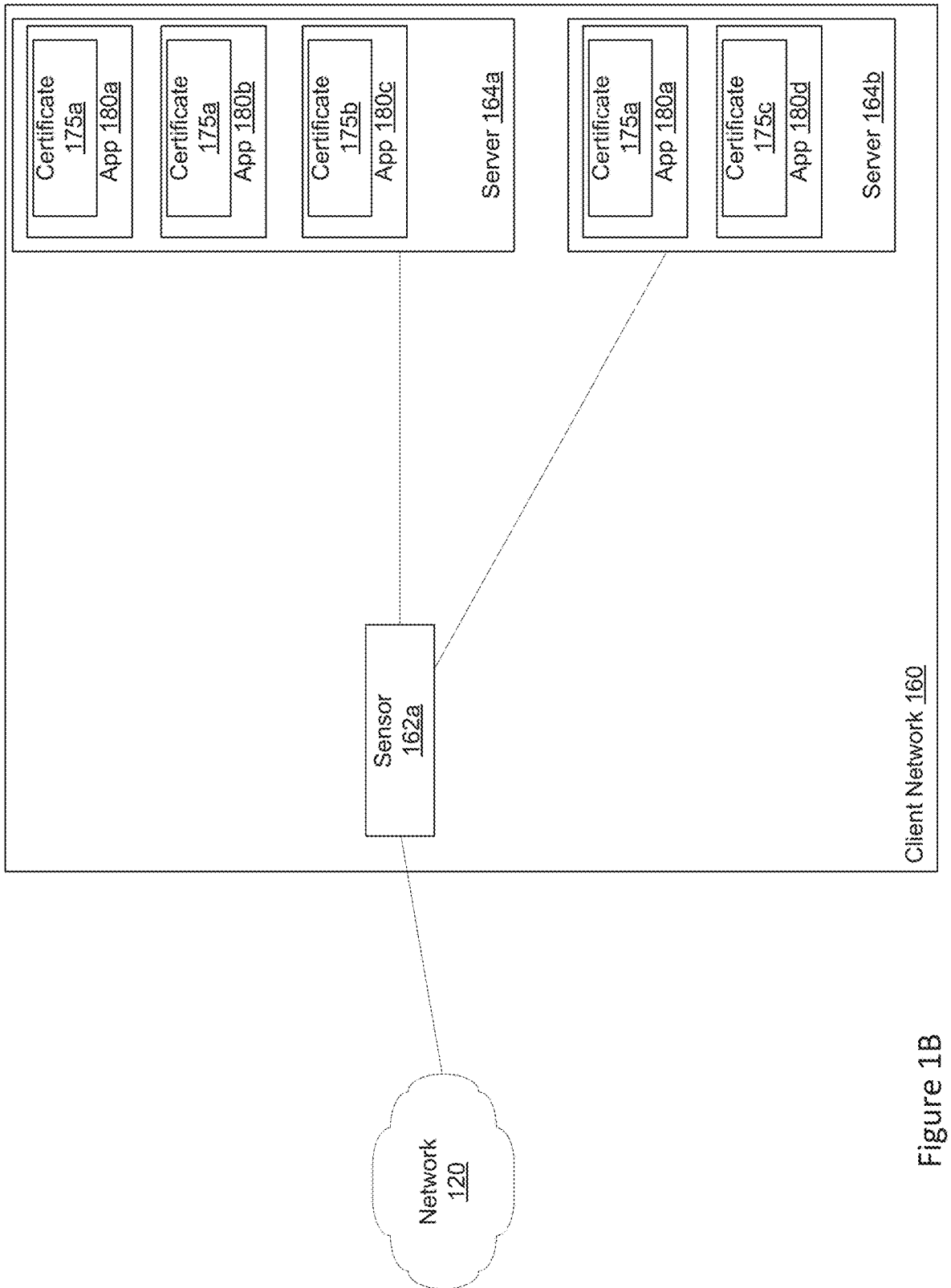
FIG. 1B illustrates an example topology of a client network of FIG. 1, according to another embodiment.

FIG. 1B illustrates another example topology of the client network 160. As shown, the client network 160 includes a sensor 162a associated with a server 164a and a server 164b. The server 164a runs applications 180a-180c. Each of applications 180a and 180b use the same digital certificate 175a. Accordingly, the server 164a may be part of a first server cluster sharing digital certificate 175a. Further, the application 180c may use the digital certificate 175b, so the server 164a may further be a part of a second server cluster sharing digital certificate 175b.

The server 164b runs applications 180a and 180d. Application 180a may be the same application running on server 164a and may use the same digital certificate 175a. Accordingly, the server 164b may also be part of the first server cluster sharing digital certificate 175a. Application 180d may use the digital certificate 175c, so the server 164b may further be a part of a third server cluster sharing digital certificate 175c.

Accordingly, in some embodiments, different servers 164 may run the same application with the same digital certificate 175, different applications may use the same digital certificate 175, and/or servers 164 may be part of more than one server cluster.

Figure 2:
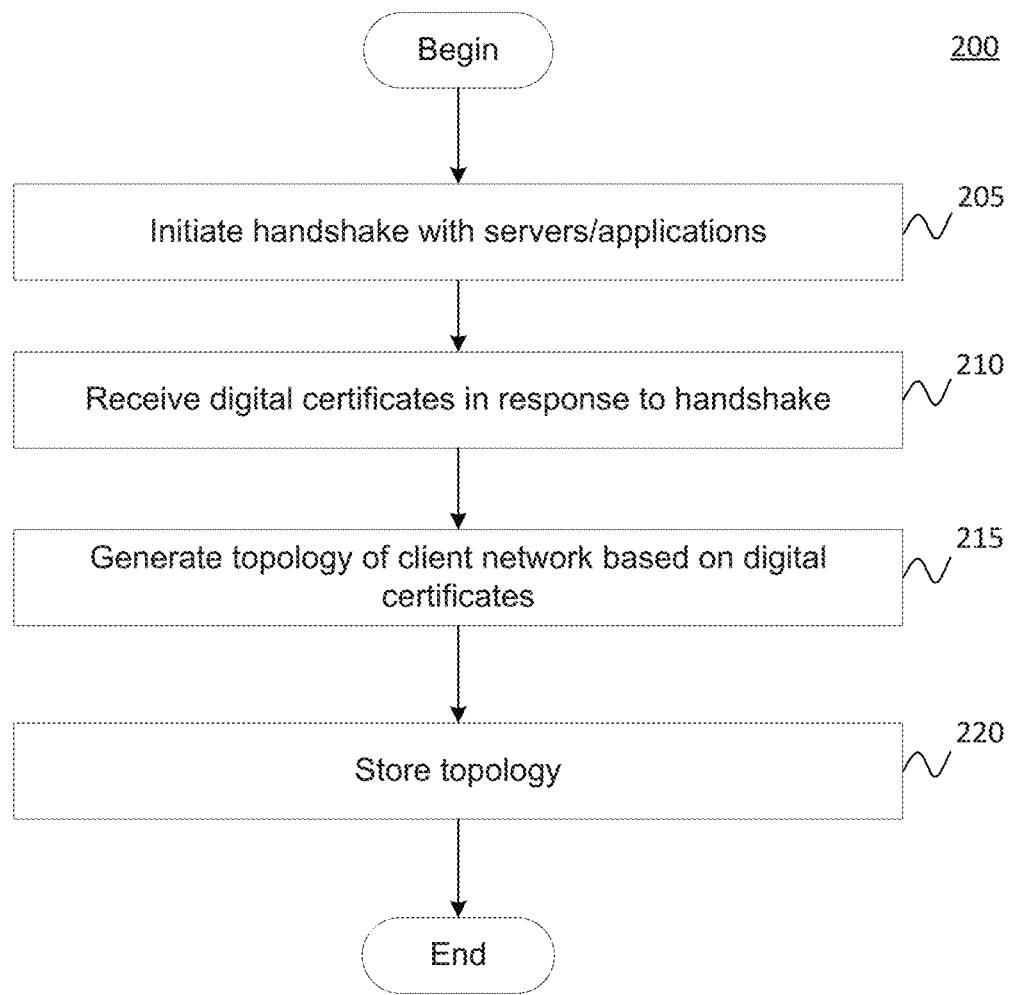
FIG. 2 illustrates a method to determine a topology of a client network, according to one embodiment.

FIG. 2 illustrates a method 200 to determine a topology of a client network, according to one embodiment. As shown, the method 200 begins at a step 205 where an application (e.g., an application on the certificate system 110, such as application 127) initiates a digital certificate handshake (e.g., SSL handshake) with each of the applications running on servers on a client network. For example, the application 127 may direct each of the sensors 162 to initiate an SSL handshake with applications 180 running on servers 164. In another example, the SSL handshakes may be initiated by one or more applications (e.g., web browser 135, web browser 145, device 150, etc.) trying to establish a secure communication session with applications 180.

At step 210, the application may receive digital certificates from the applications 180 in response to the handshake procedure initiated. For example, the sensors 162 may receive the digital certificates from the applications 180 running on servers 164 that the sensors 162 are associated with. Further, the sensors 162 may send information about the digital certificates to the application 127. The information about the digital certificates may include which servers 164 and applications 180 the digital certificates are associated with, how the servers 164 are connected to each other and sensors 162, and/or how the sensors 162 are connected to each other.

At step 215, the application may generate a topology of the client network based on the receive information about the digital certificates. For example, the application 127 may generate a topology indicating which servers 164 and applications 180 the digital certificates are associated with, how the servers 164 are connected to each other and sensors 162, and/or how the sensors 162 are connected to each other.

At step 220, the application may store the topology. For example, the application 127 may store the topology 129 in the CMS 125.

Figure 3:
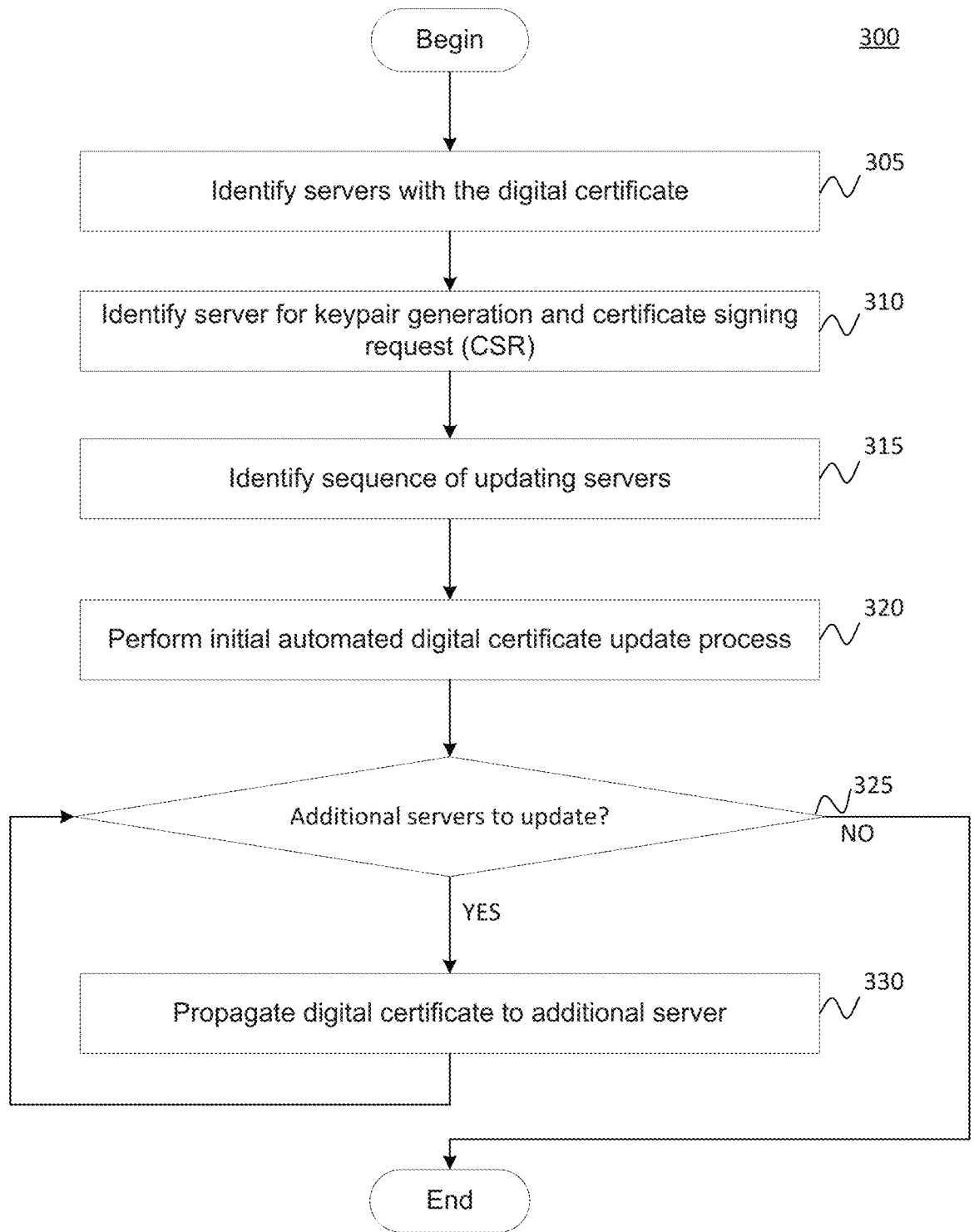
FIG. 3 illustrates a method to automate secure propagation of a configuration to a plurality of servers in a server cluster, according to one embodiment.

FIG. 3 illustrates a method 300 to automate secure propagation of a configuration to a plurality of servers in a server cluster, according to one embodiment. As shown, the method 300 begins at step 305 where an application (e.g., an application on the certificate system 110, such as, the application 127) identifies the servers of a server cluster on a client network that share a digital certificate. For example, the application 127 may, based on the topology 129, determine which servers 164 and/or applications 180 running on the servers 164 share or will share the same digital certificate 175.

At step 310, the application may identify one of the servers of the server cluster to generate the new keypair including a public key and private key to be associated with the new digital certificate to be propagated to the servers of the server cluster and a certificate signing request (CSR) for the new digital certificate. For example, the application 127 may identify a particular server 164 of the server cluster of the client network 160 to generate the new keypair. In some embodiments, the application 127 may identify the particular server 164 at random. In some embodiments, the application 127 may identify the particular server 164 based on some criteria, such as, user selection, maintenance windows of the servers 164 of the server cluster, peak load times of the servers 164 of the server cluster, etc.

At step 315, the application may determine a sequence to update the servers of the server cluster with the new digital certificate. For example, the application 127 may determine the order to update the servers 164 of the server cluster of the client network 160 associated with the new digital certificate. In some embodiments, the application 127 may identify the order at random. In some embodiments, the application 127 may identify the order based on some criteria, such as, user selection, maintenance windows of the servers 164 of the server cluster, peak load times of the servers 164 of the server cluster, etc.

At step 320, the automated digital certificate update process to update the digital certificate at the server identified to generate the new keypair may be initiated by the application. For example, the application 127 may initiate a process to have the identified server 164 generate the new keypair, have the identified server 164 transmit the associated public key to the certificate system 110, and have the certificate system 110 generate and send an updated digital certificate to the identified server 164. This process is described in more detail with respect to FIG. 4.

At step 325, the application may determine whether any additional servers in the server cluster still need to be updated with the new digital certificate. For example, the application 127 may determine if any servers 164 in the server cluster has not been updated with the new digital certificate.

If at step 325, the application determines that no additional servers in the server cluster need to be updated with the new digital certificate, the method 300 ends. If at step 325, the application determines that additional servers in the server cluster need to be updated with the new digital certificate, the method 300 proceeds to step 330. At step 330, the application propagates the new digital certificate and private key generated in step 320 to another server, such as according to the sequence identified in step 315. The propagation of the new digital certificate and associated private key is discussed in more detail with respect to FIGS. 5 and 6.

Figure 4:
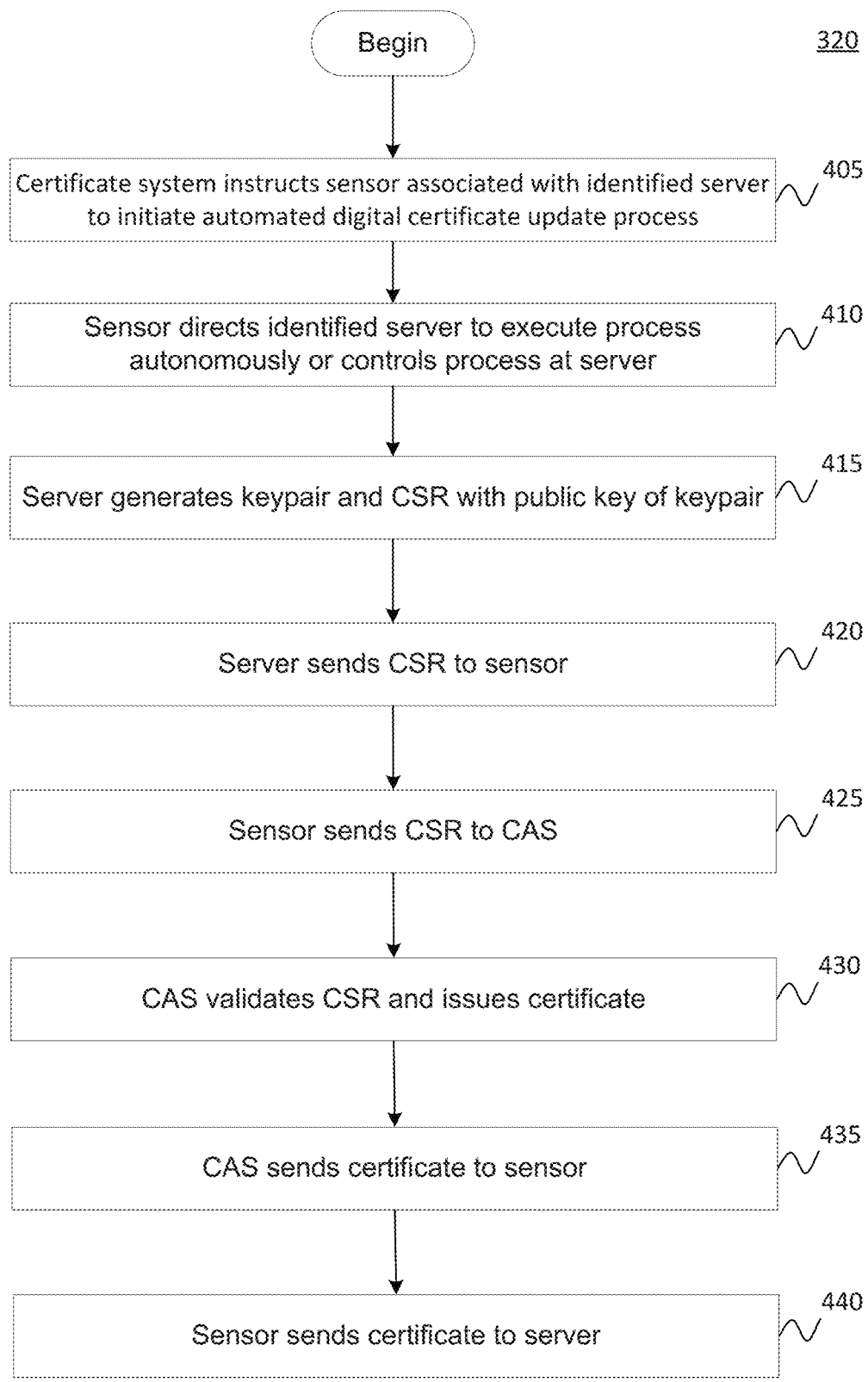
FIG. 4 illustrates a method of performing an automated digital certificate update process to update a digital certificate at a server identified to generate a new keypair, according to one embodiment.

FIG. 4 illustrates a method of performing step 320 of FIG. 3 (performing an automated digital certificate update process to update the digital certificate at the server identified to generate the new keypair), according to one embodiment. The method begins at a step 405 where the application (e.g., an application on the certificate system 100, such as, the application 127) instructs a sensor associated with the identified server to initiate an automated digital certificate update process. For example, the application 127 may instruct a sensor 162 associated with the identified server 164 to initiate an update process for generating the new digital certificate.

At step 410, the sensor associated with the identified server may either direct the identified server to execute the update process autonomously or the sensor may control the update process at the identified server. For example, as noted herein, if the identified server 164 is able to execute processes on its own, then the identified server 164 may execute the update process autonomously. Further, as noted herein, if the identified server 164 is unable to execute processes on its own, then the sensor 162 associated with the identified server 164 may control the update process at the identified server 164.

At step 415, the identified server may generate a keypair and a CSR. For example, the identified server 164 may generate a private key and a public key to be associated with the new digital certificate. Further, the identified server 164 may generate a CSR that includes the generated public key to be associated with the new digital certificate. The identified server 164 may store the generated private key and a public key to be associated with the new digital certificate.

At step 420, the server may send the generated CSR to its associated sensor. For example, the server 164 may send the CSR to its associated sensor 162. Further, at step 425, the sensor may send the CSR to the certificate system. For example, the sensor 162 may send the CSR to the CAS 115 of the certificate system 110 via network 120.

At step 430, the certificate system may validate the CSR and issue the new digital certificate. For example, the application 117 of the CAS 115 of the certificate system 110 may validate the received CSR and generate a new digital certificate associated with the keypair generated by the identified server 164. At step 435, the certificate system may send the new digital certificate to the sensor associated with the identified server. For example, the application 117 may direct the CAS 115 to send the new digital certificate to the sensor 162 associated with the identified server 164 via the network 120.

At step 440, the sensor may send the new digital certificate to the identified server. For example, the sensor 162 associated with the identified server 164 may send the new digital certificate to the identified server 164. The identified server 164 may store the new digital certificate along with the associated private key generated by the identified server 164, and accordingly be updated with the new digital certificate. The step 320 of method 300 may then be complete, and the method 300 may proceed to step 325 as discussed herein.

Figure 5:
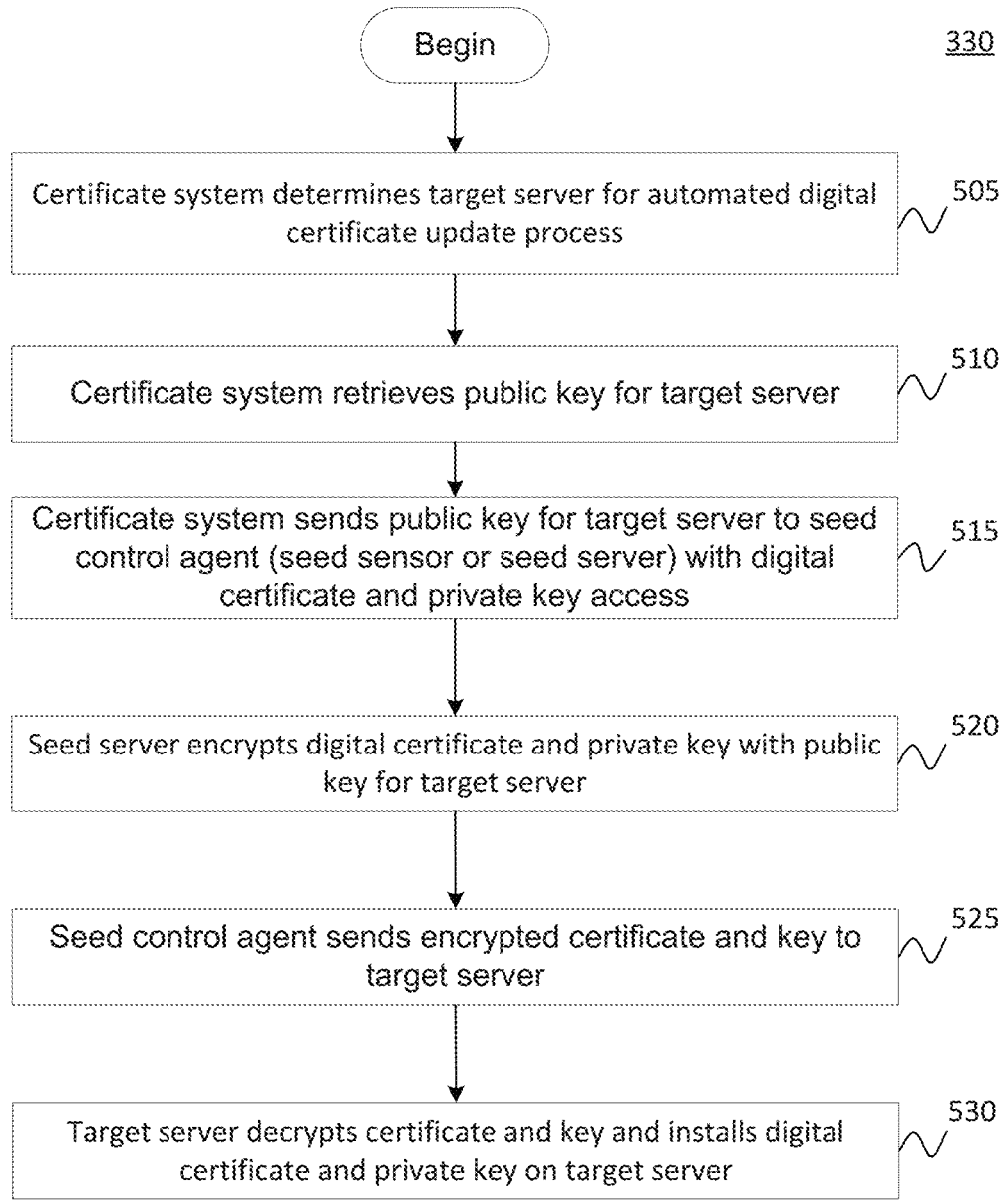
FIG. 5 illustrates a method of propagating a new digital certificate and private key generated by a server to another server, according to one embodiment.

FIG. 5 illustrates a method of performing step 330 of FIG. 3 (propagating a new digital certificate and private key generated by a server to another server), according to one embodiment. The method begins at a step 505, where an application (e.g., an application on the certificate system 110, such as, the application 127) determines a target server to perform an automated digital certificate update process. For example, the application 127 may determine a server 164 of the server cluster associated with the new digital certificate to update that has not been updated according to the sequence identified at step 315. The identified server 164 to update may be referred to as the target server.

At 510, the application may retrieve the public key of a keypair associated with the target server. For example, as noted, each server 164 may have a keypair associated therewith for secure communications with the server 164. The certificate system 110 may store the public key of the keypair (e.g., at the CAS 115 or the CMS 125), and the server 164 may store the corresponding private key.

At 515, the application may send the retrieved public key associated with the target server to a seed control agent (e.g., seed sensor or seed server) that has access to the new digital certificate to be propagated to the target server. For example, the application 127 may send the retrieved public key associated with the target server to the seed control agent. For example, as noted, if a server 164 with the new digital certificate (seed server) is able to execute processes on its own as discussed herein, the server 164 may itself act as a seed control agent. However, if a server 164 with the new digital certificate is not able to execute processes on its own as discussed herein, the sensor 162 (seed sensor) associated with the server 164 may act as a seed control agent. In particular, the sensor 162 may control the server 164.

At 520, the seed server may encrypt the new digital certificate and associated private key using the public key of the target server. For example, a server 164 itself, or under control of its associated sensor 162, that has stored the new digital certificate and associated private key may encrypt them using the public key of the target server. At 525, the seed control agent may send the encrypted digital certificate and associated private key to the target server. For example, the server 164 itself, or under control of its associated sensor 162, may directly or indirectly send the encrypted digital certificate and associated private key to the target server. The process for sending the encrypted digital certificate and associated private key to the target server is described in more detail with respect to FIG. 6.

At 530, the target server decrypts the encrypted digital certificate and associated private key using the private key of the keypair associated with the target server and installs/stores the new digital certificate and associated private key. In some embodiments, the target server may now be able to act as a seed server to further propagate the new digital certificate and associated private key to additional servers of the server cluster in addition to, or alternative to, any other seed servers in the server cluster.

Figure 6:
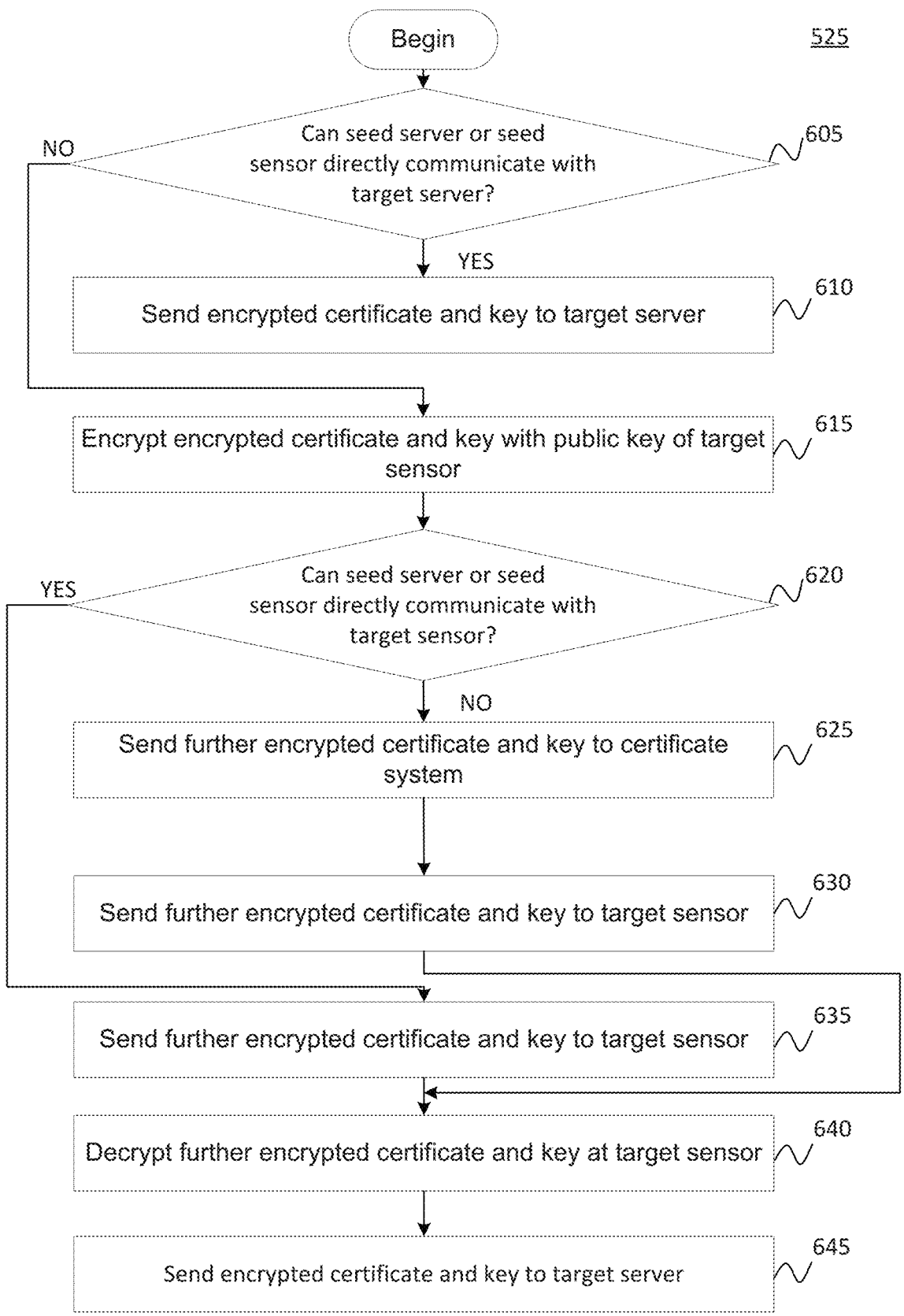
FIG. 6 illustrates a method of sending an encrypted digital certificate and associated private key to a target server, according to one embodiment.

FIG. 6 illustrates a method of performing step 525 of FIG. 5 (sending the encrypted digital certificate and associated private key to the target server), according to one embodiment. The method begins at a step 605 where it is determined if the seed server or seed sensor having access to the encrypted digital certificate and associated private key can directly communicate with the target server. For example, the seed control agent may make the determination based on information from the certificate system 110 about the topology 129 of the client network 160.

If either the seed server or seed sensor can directly communicate with the target server, the method continues to step 610. At step 610, the seed server or seed sensor directly communicates the encrypted digital certificate and associated private key to the target server. For example, if the seed server or seed sensor having access to the encrypted digital certificate and associated private key can directly communicate with the target server via a direct communication path, the seed server or seed sensor (in some embodiments, preferably the seed server if both can directly communicate with the target server) sends the encrypted digital certificate and associated private key directly to the target server.

If neither the seed server nor seed sensor can directly communicate with the target server, the method continues to step 615. At step 615, the seed sensor or seed controller further encrypts the encrypted digital certificate and associated private key with a public key of a keypair associated with a sensor (referred to as a target sensor) associated with the target server.

Further, at step 620, it is determined if the seed server or seed sensor can directly communicate with the target sensor. For example, the seed control agent may make the determination based on information from the certificate system 110 about the topology 129 of the client network 160.

If either the seed server or seed sensor can directly communicate with the target sensor, the method continues to step 635. At step 635, the seed server or seed sensor directly communicates the further encrypted digital certificate and associated private key to the target sensor. For example, if the seed server or seed sensor having access to the further encrypted digital certificate and associated private key can directly communicate with the target sensor via a direct communication path, the seed server or seed sensor (in some embodiments, preferably the seed server if both can directly communicate with the target sensor) sends the further encrypted digital certificate and associated private key directly to the target sensor. The method then continues to step 640.

If neither the seed server nor seed sensor can directly communicate with the target sensor, the method continues to step 625. At step 625, the seed sensor sends the further encrypted digital certificate and associated private key to the certificate system. For example, the seed sensor sends the further encrypted digital certificate and associated private key to the application 127 running on the certificate system 110. At step 630, the certificate system sends the further encrypted digital certificate and associated private key directly to the target sensor. For example, the application 127 directs the CMS 125 to send the further encrypted digital certificate and associated private key directly to the target sensor. The method then continues to step 640.

At step 640, the target sensor decrypts the further encrypted digital certificate and associated private key using the private key associated with the target sensor. At step 645, the target sensor sends the encrypted digital certificate and associated private key to the target server. The step 525 of FIG. 5 may then be complete, and the method of FIG. 5 may proceed to step 530 as discussed herein.

It should be noted, that in some embodiments, multiple levels of encryption between devices (e.g., sensors and servers) as described with respect to FIG. 6 may not be used. For example, once the digital certificate and associated private key are encrypted they may not be further encrypted for communication between devices. Further, in some embodiments, different keypairs (e.g., generated on the fly for a single communication) or encryption schemes may be used to secure communications between any set of devices.

Further, in some embodiments, a plurality of public keys associated with a plurality of target servers may be sent by the certificate system 110 to a seed control agent at a time. Accordingly, the seed server associated with the seed control agent may separately encrypt the digital certificate and associated private key using each of the plurality of public keys. The seed control agent may then send the separately encrypted digital certificates and associated private keys to the certificate system 110, which may the control how the encrypted digital certificates and associated private keys are communicated (e.g., via which path or devices) to the target servers.

In some embodiments, the path or devices used to transmit encrypted digital certificates and associated private keys between servers may be limited based on certain restrictions (e.g., enterprise restrictions for a client network). For example, communication of the encrypted digital certificates and associated private keys to the network 120 (e.g., the certificate system 110) may be prohibited, or between sensors may be prohibited, and therefore only non-prohibited paths may be used to communicate.

Figure 7:
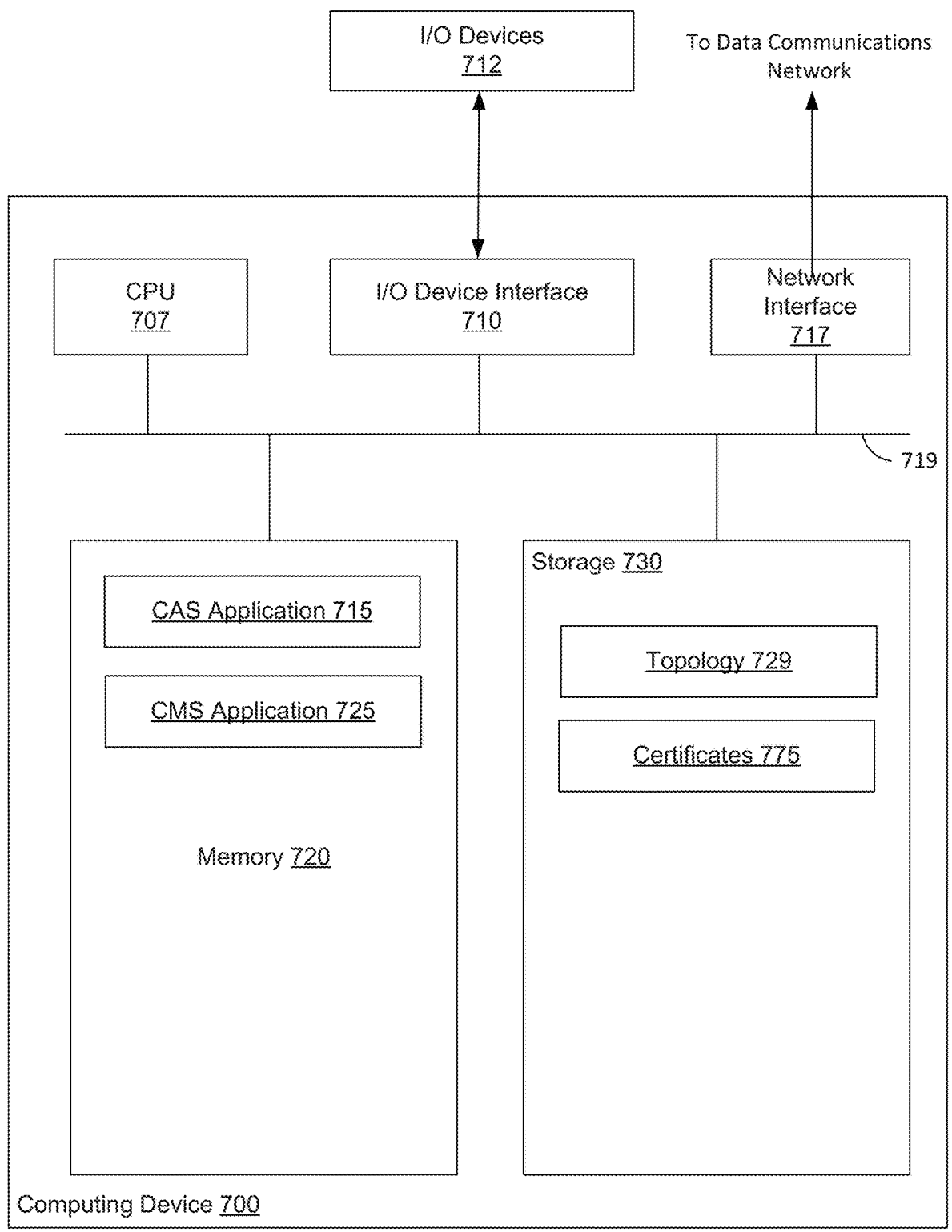
FIG. 7 illustrates an example computing system configured to automate secure propagation of a configuration to a plurality of servers in a server cluster, according to one embodiment.

FIG. 7 illustrates an example computing system 700 configured to automate secure propagation of a configuration to a plurality of servers in a server cluster, according to one embodiment. The computing system 700 may, in some embodiments, be an example of the certificate system 110. As shown, the computing system 700 includes, without limitation, a central processing unit (CPU) 707, a network interface 717, a memory 720, and storage 730, each connected to a bus 719. The computing system 700 may also include an I/O device interface 710 connecting I/O devices 712 (e.g., keyboard, display and mouse devices) to the computing system 700. Further, in context of this disclosure, the computing elements shown in computing system 700 may correspond to a physical computing system (e.g., a system in a data center) or may be a virtual computing instance executing within a computing cloud.

The CPU 707 retrieves and executes programming instructions stored in the memory 720 as well as stores and retrieves application data residing in the storage 730. The bus 719 is used to transmit programming instructions and application data between the CPU 707, I/O devices interface 710, storage 730, network interface 717, and memory 720. Note, CPU 707 is included to be representative of a single CPU, multiple CPUs, a single CPU having multiple processing cores, and the like. And the memory 720 is generally included to be representative of a random access memory. The storage 730 may be a disk drive storage device. Although shown as a single unit, the storage 730 may be a combination of fixed and/or removable storage devices, such as fixed disc drives, removable memory cards, optical storage, network attached storage (NAS), or a storage area-network.

Illustratively, the memory 720 includes a CMS application 725 (e.g., application 127) and a CAS application (e.g., application 117). And the storage 730 includes a client network topology 729 (e.g., topology 129) and digital certificates 775 (e.g., digital certificates 175).

As described, the CAS application 117 may generate and store copies of digital certificates for servers on a client network. Further, as described, the CMS application 725 may determine a topology of a client network and direct automated secure propagation of a new configuration (e.g., digital certificate) to servers of a server cluster in the client network. For example, the CMS application 725 may identify a server in the server cluster to generate a keypair for the new digital certificate and cause the CAS application 117 to generate the new digital certificate based on the generated keypair. The CMS application 725 may further identify additional servers in the server cluster to update with the new digital certificate and direct the identified server to securely communicate the new digital certificate to the additional servers.

Figure 8:
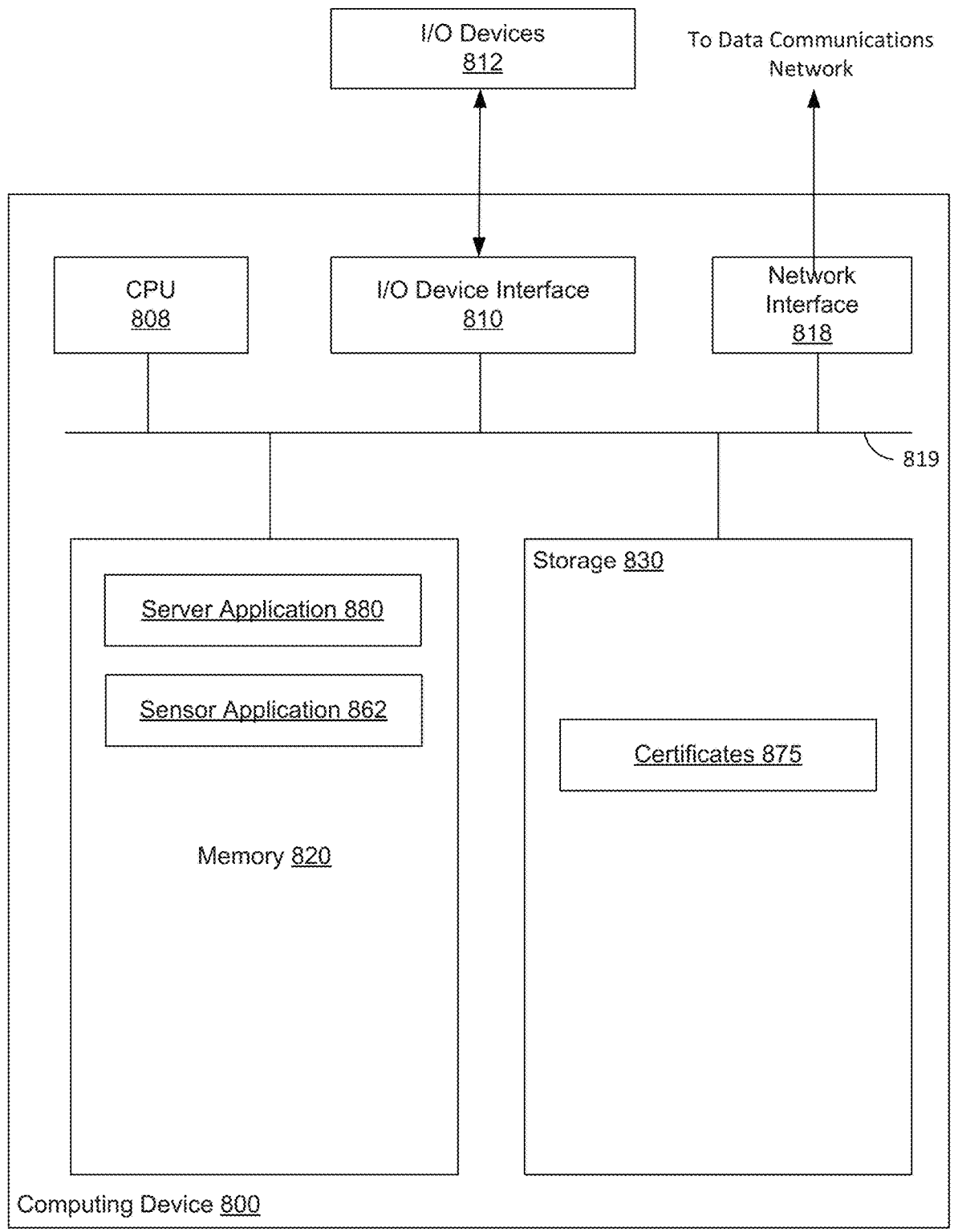
FIG. 8 illustrates an example computing system configured to automate secure propagation of a configuration to a plurality of servers in a server cluster, according to one embodiment.

FIG. 8 illustrates an example computing system 800 configured to automate secure propagation of a configuration to a plurality of servers in a server cluster, according to one embodiment. The computing system 800 may, in some embodiments, be an example of a sensor 162 and/or a server 164. As shown, the computing system 800 includes, without limitation, a central processing unit (CPU) 808, a network interface 818, a memory 820, and storage 830, each connected to a bus 819. The computing system 800 may also include an I/O device interface 810 connecting I/O devices 812 (e.g., keyboard, display and mouse devices) to the computing system 800. Further, in context of this disclosure, the computing elements shown in computing system 800 may correspond to a physical computing system (e.g., a system in a data center) or may be a virtual computing instance executing within a computing cloud.

The CPU 808 retrieves and executes programming instructions stored in the memory 820 as well as stores and retrieves application data residing in the storage 830. The bus 819 is used to transmit programming instructions and application data between the CPU 808, I/O devices interface 810, storage 830, network interface 818, and memory 820. Note, CPU 808 is included to be representative of a single CPU, multiple CPUs, a single CPU having multiple processing cores, and the like. And the memory 820 is generally included to be representative of a random access memory. The storage 830 may be a disk drive storage device. Although shown as a single unit, the storage 830 may be a combination of fixed and/or removable storage devices, such as fixed disc drives, removable memory cards, optical storage, network attached storage (NAS), or a storage area-network.

Illustratively, the memory 820 includes a server application 880 (e.g., application 180) and/or a sensor application 862 (e.g., sensor 162). And the storage 830 includes digital certificates 875 (e.g., digital certificates 175).

As described, the server application 880 may be any of a variety of applications, such as web-server applications (e.g., Apache or Nginx) configured to communicate with client systems using HTTPS and related protocols. The application 880 may also have an associated certificate 875 utilized for secure communications with such client systems. The certificate 875 may be updated by the processes described herein. Further, as described, the sensor application 862 may be an application configured to communicate between servers (e.g., server applications 880), other sensor applications, and a certificate system. For example, the sensor application 862 may facilitate propagation of a digital certificate 875 from one server to another.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

What is claimed is:

1. A computer-implemented method for updating at least one computing device of a plurality of computing devices, the method comprising:
   obtaining, at a first computing device, a digital certificate, a key associated with the digital certificate, a first public key associated with a second computing device, and a second public key associated with a third computing device, wherein the second computing device comprises an intermediary computing device;
   determining that the first computing device is unable to directly communicate with the third computing device;
   encrypting the digital certificate and the key associated with the digital certificate using the first public key to form a first encrypted digital certificate and a first encrypted key;
   sending the first encrypted digital certificate and the first encrypted key to the second computing device based at least in part on determining that the first computing device is unable to directly communicate with the third computing device, wherein the second computing device is updated with the digital certificate and the key associated with the digital certificate;
   encrypting the digital certificate and the key associated with the digital certificate using the second public key to form a second encrypted digital certificate and a second encrypted key; and
   sending the second encrypted digital certificate and the second encrypted key to the third computing device, wherein the third computing device is updated with the digital certificate and the key associated with the digital certificate.

2. The method of claim 1, wherein the second computing device decrypts the first encrypted digital certificate and the first encrypted key using a first private key associated with the first public key.

3. The method of claim 1, wherein encrypting the digital certificate and the key associated with the digital certificate using the first public key comprises;
   encrypting, by the first computing device, the digital certificate and the key associated with the digital certificate using the first public key to form the first encrypted digital certificate and the first encrypted key, and
   wherein encrypting the digital certificate and the key associated with the digital certificate using the second public key comprises:
   encrypting, by the first computing device, the digital certificate and the key associated with the digital certificate using the second public key associated with the third computing device to form the second encrypted digital certificate and the second encrypted key.

4. The method of claim 1, wherein encrypting the digital certificate and the key associated with the digital certificate using the first public key comprises:
  encrypting, by the first computing device, the digital certificate and the key associated with the digital certificate using the first public key to form the first encrypted digital certificate and the first encrypted key, and
  wherein encrypting the digital certificate and the key associated with the digital certificate using the second public key comprises:
  encrypting, by the second computing device, the digital certificate and the key associated with the digital certificate using the second public key associated with the third computing device to form the second encrypted digital certificate and the second encrypted key.

5. The method of claim 1, wherein the first computing device is updated with the digital certificate and the key associated with the digital certificate.

6. A first computing device, the first computing device comprising:
  memory; and
  a processor communicatively coupled to the memory and configured to:
   obtain a digital certificate, a key associated with the digital certificate, a first public key associated with a second computing device, and a second public key associated with a third computing device, wherein the second computing device comprises an intermediary computing device;
   encrypt the digital certificate and the key associated with the digital certificate using the first public key to form a first encrypted digital certificate and a first encrypted key;
   send the first encrypted digital certificate and the first encrypted key to the second computing device, wherein the second computing device is updated with the digital certificate and the key associated with the digital certificate;
   encrypt the digital certificate and the key associated with the digital certificate using the second public key to form a second encrypted digital certificate and a second encrypted key; and
   send, by the second computing device, the second encrypted digital certificate and the second encrypted key to the third computing device based at least in part on determining that the first computing device is unable to directly communicate with the third computing device, wherein the third computing device is updated with the digital certificate and the key associated with the digital certificate.

7. The first computing device of claim 6, wherein the processor comprises a first processor, wherein the second computing device comprises a second processor, wherein the second processor is configured to decrypt the first encrypted digital certificate and the first encrypted key using a first private key associated with the first public key.

8. The first computing device of claim 6, wherein the processor comprises a first processor, wherein the third computing device comprises a second processor, wherein the second processor is configured to decrypt the second encrypted digital certificate and the second encrypted key using a second private key associated with the first public key.

9. The first computing device of claim 6, wherein the processor is further configured to update the first computing device with the digital certificate and the key associated with the digital certificate.

10. The first computing device of claim 6, wherein the processor is further configured to, for each of a plurality of third public keys:
  encrypt the digital certificate and the key associated with the digital certificate using a third public key to form a particular encrypted digital certificate and a particular encrypted key; and
  send the particular encrypted digital certificate and the particular encrypted key to a particular computing device associated with the third public key, wherein the particular computing device is updated with the digital certificate and the key associated with the digital certificate.

11. A non-transitory computer-readable medium comprising computer-executable instructions that, when executed by a first computing device, cause the first computing device to:
  obtain a digital certificate, a key associated with the digital certificate, a first public key associated with a second computing device, and a second public key associated with a third computing device;
  identify peak load times for the second computing device and the third computing device;
  determine a sequence by which to update the second computing device and the third computing device based on the peak load times; and
  encrypt the digital certificate and the key associated with the digital certificate using the first public key to form first encrypted data;
  send, in the determined sequence, the first encrypted data to the second computing device, wherein the second computing device is updated with the digital certificate and the key associated with the digital certificate;
  encrypt the digital certificate and the key associated with the digital certificate using the second public key to form second encrypted data; and
  send, in the determined sequence, the second encrypted data to the third computing device, wherein the third computing device is updated with the digital certificate and the key associated with the digital certificate.

12. The non-transitory computer-readable medium of claim 11, wherein the second computing device is configured to decrypt the first encrypted data using a first private key associated with the second computing device.

13. The non-transitory computer-readable medium of claim 11, wherein execution of the computer-executable instructions by the first computing device, further causes the first computing device to update the first computing device with the digital certificate and the key associated with the digital certificate.

14. The non-transitory computer-readable medium of claim 11, wherein the third computing device is configured to decrypt the second encrypted data using a second private key associated with the third computing device.

15. The non-transitory computer-readable medium of claim 11, wherein the second computing device is configured to:
  encrypt the digital certificate and the key associated with the digital certificate using a third public key associated with a fourth computing device to form third encrypted data; and send the third encrypted data to the fourth computing device, wherein the fourth computing device is updated with the digital certificate and the key associated with the digital certificate.

16. The non-transitory computer-readable medium of claim 11, wherein to send the first encrypted data to the second computing device, execution of the computer-executable instructions by the first computing device, further causes the first computing device to:
determine that the first computing device is unable to directly communicate with the second computing device; and
based on determining the first computing device is unable to directly communicate with the second computing device, send the first encrypted data through an intermediary device, wherein to send the first encrypted data through the intermediary device, execution of the computer-executable instructions by the first computing device, further causes the first computing device to:
encrypt the first encrypted data to generate further encrypted data using a third public key associated with the intermediary device, and
send the further encrypted data to the intermediary device,
wherein the intermediary device is configured to:
decrypt the further encrypted data using a third private key associated with intermediary device, and
send the first encrypted data to the second computing device.

17. The non-transitory computer-readable medium of claim 11, wherein execution of the computer-executable instructions by the first computing device, further causes the first computing device to update each of a plurality of computing devices with the digital certificate and the key associated with the digital certificate.

18. The non-transitory computer-readable medium of claim 17, wherein execution of the computer-executable instructions by the first computing device, further causes the first computing device to generate a plurality of encrypted digital certificates and a plurality of encrypted keys based at least in part on encrypting the digital certificate and the key associated with the digital certificate using each public key of a plurality of public keys associated with the plurality of computing devices.

19. The non-transitory computer-readable medium of claim 11, wherein the determined sequence comprises a sequence by which to update a plurality of computing devices based on peak load times of the plurality of computing devices, wherein the plurality of computing devices comprise the second computing device, the third computing device, and a fourth computing device, wherein execution of the computer-executable instructions by the first computing device, further causes the first computing device to:
send, in the determined sequence, an encrypted digital certificate and an encrypted key to each computing device of the plurality of computing devices.

20. The method of claim 1,
wherein encrypting the digital certificate and the key associated with the digital certificate using the second public key comprises encrypting, by the second computing device, the digital certificate and the key associated with the digital certificate using the second public key, wherein sending the second encrypted digital certificate and the second encrypted key to the third computing device comprises sending by the second computing device the second encrypted digital certificate and the second encrypted key to the third computing device.

21. A first computing device, the first computing device comprising:
memory; and
a first processor communicatively coupled to the memory and configured to:
obtain a digital certificate, a key associated with the digital certificate, a first public key associated with a second computing device, and a second public key associated with an intermediary computing device;
encrypt the digital certificate and the key associated with the digital certificate using a first public key associated with a second computing device to form a first encrypted digital certificate and a first encrypted key;
encrypt the first encrypted digital certificate and the first encrypted key using the second public key to form a second encrypted digital certificate and a second encrypted key based at least in part on determining that the first computing device is unable to directly communicate with the second computing device; and
send the second encrypted digital certificate and the second encrypted key to the intermediary computing device, wherein the intermediary computing device comprises a second processor, wherein the second processor is configured to:
decrypt the second encrypted digital certificate and the second encrypted key using a second private key associated with the intermediary computing device, and
send the first encrypted digital certificate and the first encrypted key to the second computing device.

22. A first computing device, the first computing device comprising:
memory; and
a first processor communicatively coupled to the memory and configured to:
obtain a digital certificate, a key associated with the digital certificate, a first public key associated with an intermediary computing device, and a second public key associated with a second computing device;
encrypt the digital certificate and the key associated with the digital certificate using the first public key to form a first encrypted digital certificate and a first encrypted key; and
send the first encrypted digital certificate and the first encrypted key to the intermediary computing device based at least in part on determining that the first computing device is unable to directly communicate with the second computing device, wherein the intermediary computing device comprises a second processor, wherein the second processor is configured to:
decrypt the first encrypted digital certificate and the first encrypted key using a private key associated with the intermediary computing device to form the digital certificate and the key associated with the digital certificate,
encrypt the digital certificate and the key associated with the digital certificate using the second public key to form a second encrypted digital certificate and a second encrypted key, and send the second encrypted digital certificate and the second encrypted key to the second computing device, wherein the second computing device is updated with the digital certificate and the key associated with the digital certificate.

23. A first computing device, the first computing device comprising:
memory; and
a processor communicatively coupled to the memory and configured to:
obtain a digital certificate, a key associated with the digital certificate, and a plurality of public keys, each public key of the plurality of public keys corresponding to a particular second computing device of a plurality of second computing devices; and
for each public key of the plurality of public keys:
encrypt the digital certificate and the key associated with the digital certificate using the public key to form an encrypted digital certificate and an encrypted key, and
send the encrypted digital certificate and the encrypted key to a second computing device of the plurality of second computing devices based at least in part on determining that the first computing device is unable to directly communicate with a third computing device, the second computing device corresponding to the public key, wherein the second computing device is updated with the digital certificate and the key associated with the digital certificate, wherein the second computing device is an intermediary computing device, wherein the second computing device routes a further encrypted digital certificate and a further encrypted key based on the digital certificate and the key to the third computing device.

24. A first computing device, the first computing device comprising:
memory; and
a processor communicatively coupled to the memory and configured to:
obtain a digital certificate, a key associated with the digital certificate, and a first public key associated with a second computing device of a plurality of computing devices;
encrypt the digital certificate and the key associated with the digital certificate using the first public key to form a first encrypted digital certificate and a first encrypted key;
identify peak load times for each computing device of a plurality of computing devices;
determine a sequence by which to update the plurality of computing devices based on the peak load times; and
send, in the determined sequence, an encrypted digital certificate and an encrypted key to each computing device of the plurality of computing devices, wherein sending the encrypted digital certificate and the encrypted key to each computing device of the plurality of computing devices comprises sending the first encrypted digital certificate and the first encrypted key to the second computing device.

* * * * *